US007878596B2

United States Patent
Brunner et al.

(10) Patent No.: US 7,878,596 B2
(45) Date of Patent: Feb. 1, 2011

(54) AUTOMATIC HEADREST ACTIVATION GEAR

(75) Inventors: Stefan Brunner, Freising (DE); Karsten Mueller, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 318 days.

(21) Appl. No.: 12/127,351

(22) Filed: May 27, 2008

(65) Prior Publication Data

US 2008/0315653 A1    Dec. 25, 2008

(30) Foreign Application Priority Data

Jun. 25, 2007  (DE)  ........................ 10 2007 029 166

(51) Int. Cl.
 *B60N 2/36* (2006.01)
 *B60N 2/48* (2006.01)
(52) U.S. Cl. ................................. 297/410; 297/378.12
(58) Field of Classification Search ................. 297/409, 297/410, 378.12
 See application file for complete search history.

(56) References Cited

U.S. PATENT DOCUMENTS

| | | | | |
|---|---|---|---|---|
| 4,830,434 A * | 5/1989 | Ishida et al. | ............. | 297/410 X |
| 5,011,225 A * | 4/1991 | Nemoto | ................... | 297/410 X |
| 5,145,233 A * | 9/1992 | Nagashima | ................. | 297/408 |
| 5,330,228 A * | 7/1994 | Krebs et al. | .............. | 280/801.2 |
| 5,669,666 A * | 9/1997 | Lee | ......................... | 297/410 X |
| 5,975,637 A * | 11/1999 | Geuss et al. | ............ | 297/410 X |
| 6,290,299 B1 * | 9/2001 | Frisch et al. | ................ | 297/410 |
| 6,460,931 B2 * | 10/2002 | Beck | .......................... | 297/410 |
| 7,066,545 B2 * | 6/2006 | Terada et al. | ................ | 297/410 |
| 7,140,687 B2 * | 11/2006 | Hoekstra et al. | ............ | 297/410 |
| 7,210,734 B1 * | 5/2007 | Yetukuri et al. | ..... | 297/378.12 X |
| 7,226,124 B2 * | 6/2007 | Mori et al. | .............. | 297/410 X |
| 7,445,283 B2 * | 11/2008 | Mori | ...................... | 297/410 X |
| 7,445,290 B2 * | 11/2008 | Kopetzky et al. | ........... | 297/410 |
| 2005/0116523 A1 * | 6/2005 | Terada et al. | ................ | 297/391 |

(Continued)

FOREIGN PATENT DOCUMENTS

DE    20 2004 017 045 U1    4/2006

(Continued)

OTHER PUBLICATIONS

English Abstract from WO 2006/050990 which corresponds to DE 10 2005 006 116 A1 (for which no English Abstract is available), May 18, 2006.

(Continued)

*Primary Examiner*—Rodney B White
(74) *Attorney, Agent, or Firm*—Brooks Kushman P.C.

(57) ABSTRACT

A head restraint system includes a vehicle seat comprising a seat back and a seat bottom. The system further includes a head restraint guide positioned in the seat back. The head restraint guide is adapted to hold a head restraint at a selectable position. The system further includes a first and second gear rack and a gear system adapted to contact the first and second gear racks and move said gears tracks in a relative linear manner. The first gear rack is attached to the head restraint guide while the second gear rack is fixed relative to the seat back. An actuator system drives the gear system such that positioning of the seat back in a folded position causes the head restraint guide and the head restraint positioned therein to be lowered.

8 Claims, 4 Drawing Sheets

U.S. PATENT DOCUMENTS

2006/0103216 A1* 5/2006 Hoekstra et al. ............ 297/410

FOREIGN PATENT DOCUMENTS

| DE | 10 2005 006 116 A1 | 5/2006 | | |
| --- | --- | --- | --- | --- |
| FR | 2 852 066 | 10/2004 | | |
| GB | 2057255 A | * | 4/1981 | ................. 297/410 |
| JP | 60244632 A | * | 12/1985 | ................. 297/410 |
| WO | 2006/050990 A1 | 5/2006 | | |

OTHER PUBLICATIONS

English Abstract corresponding to FR 2 852 066, Sep. 10, 2004.
English Abstract from WO 2006/048383A2 which corresponds to DE 20 2004 017 045 U1 (for which no English Abstract is available), May 11, 2006.
Office Action from the German Patent & Trademark Office dated Jan. 29, 2008.

* cited by examiner

Seat back upright

Seat back folded

AUTOMATIC HEADREST ACTIVATION GEAR

CROSS-REFERENCE TO RELATED APPLICATIONS

This application claims foreign priority benefits under 35 U.S.C. §119(a)-(d) to DE 10 2007 029 166.5, filed Jun. 25, 2007, which is hereby incorporated by reference in its entirety.

BACKGROUND OF THE INVENTION

1. Field of the Invention

In at least one aspect, the present invention relates to a head restraint systems that are incorporated into foldable vehicle seats.

2. Background Art

The competitive nature of the automotive industry provides a continuing impetus to the development of improved vehicle system. In particular, vehicle interior components are particularly important because of the direct interaction such components have with the vehicle operator and passengers. In many situations, the aesthetic appearance and functionality of such components may be determinative to a customer's decision to purchase a vehicle. Other design pressures are derived from government regulations. Government regulations frequently place restrictions on interior components that may be at odds with aesthetics. Automobile designers are therefore confronted with complex multidimensional issues that must be addressed in the design of any motor vehicle.

FMVSS 202a places restrictions of the design of head restraint systems aimed at reducing the frequency and severity of neck injury in rear end and other collisions. Moreover, since many vehicle seats are foldable, problems occur when such seats are folded with the head restraint in a raised position. Damage or misalignment of the head restraints is also possible if seat are folded with raised head restraints. These problems are particularly troublesome in smaller vehicles, which have limited passenger compartment space.

Accordingly, there is a need in the prior art for improved head restraint systems that are incorporated into foldable vehicle seats.

SUMMARY OF THE INVENTION

The present invention solves one or more problems of the prior art by providing in at least one embodiment, a head restraint activation system that automatically retracts a head restraint when a vehicle seat is folded. The head restraint system of this embodiment includes a vehicle seat comprising a seat back and a seat bottom. A head restraint having at least one post moveably positioned in the vehicle seat back. The system further includes a head restraint guide positioned in the seat back. The head restraint guide is adapted to receive the post and to securely hold the head restraint at a selectable position. The system further includes a first and second gear rack and a gear system adapted to contact the first and second gear racks and move said gears tracks in a relative linear manner. The first gear rack is attached to the head restraint guide while the second gear rack is fixed relative to the seat back. An actuator system drives the gear system such that positioning of the seat back in a folded position causes the head restraint guide and the head restraint positioned therein to be lowered.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
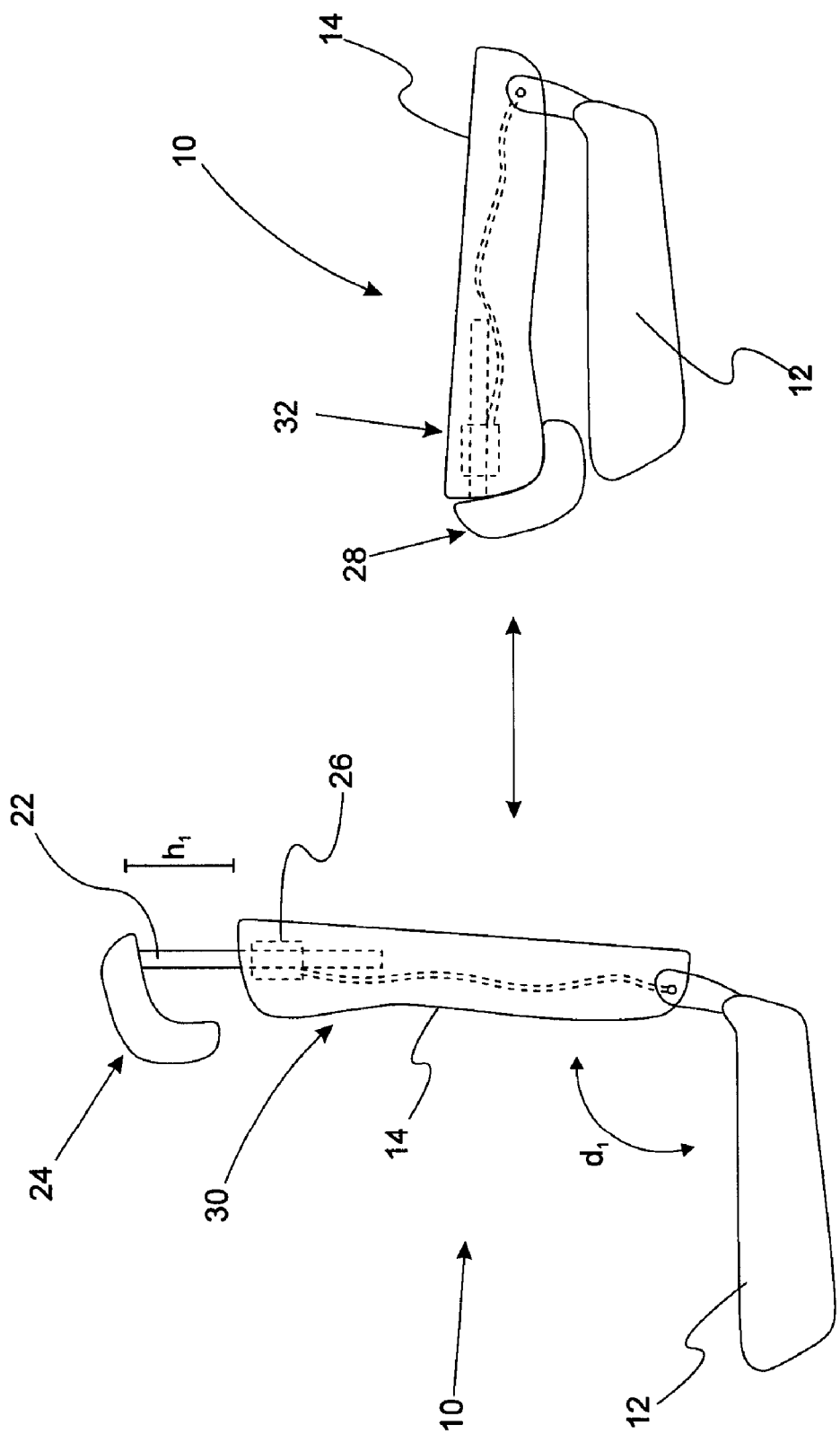
FIG. 1 provides schematic illustrations demonstrating the automatic head restraint retractability functionality of an embodiment of a head restraint activation system.

With reference to FIG. 1, schematic illustrations demonstrating the functionality of an embodiment of a head restraint activation system are provided. Vehicle seat 10 includes seat bottom 12, seat back 14, and head restraint 16. Seat back 14 is pivotably mounted to bracket 20 to move about seat bottom 12. Head restraint 16 is mounted on post(s) 22. Post(s) 22 are moveably positioned in vehicle seat back 14. When in raised position 24, head restraint 16 is at height h1 above the top of seat back 14. A vehicle occupant typically sets height h1 to a desired value. Head rest activation system 26 automatically retracts head restraint 16 from raised position 24 to lowed position 28 when seat back 14 is moved along direction d1 from design position 30 to folded position 32. Similarly, when seat back 14 is moved along direction d1 from folded position 32 to design position 30, head restraint 16 is raised to substantially the same height h1. The release of cable from Bowdon cable 36 allows movement of the head restraint as set forth below.

Figure 2:
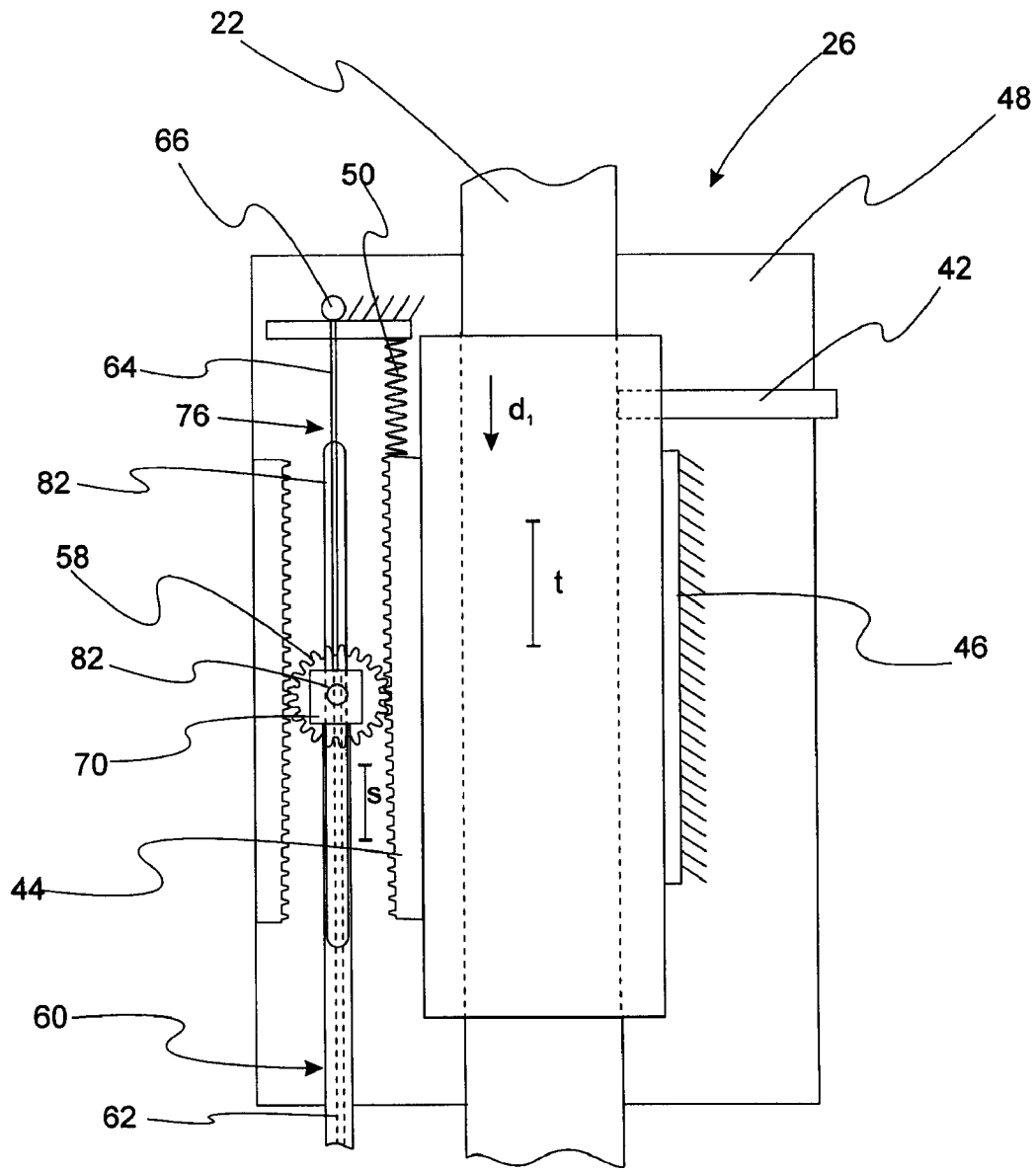
FIG. 2 is an idealized schematic illustration of a side view of an embodiment of a head restraint activation system.

With reference to FIG. 2, a schematic illustration of head restraint activation system 26 is provided. FIG. 2 is an idealized schematic illustration of a side view of the activation system. Head restraint activation system 26 includes head restraint guide 40. Post(s) 22 are moveably positioned with head restraint activation system. In a variation of the present invention, a vehicle occupant performs positioning of post(s) 22. Lock 42 holds post(s) 22 at the desired position. Gear rack 44 is attached to head restraint guide 40 such that movement of gear rack 44 causes movement of head restraint guide 40. Movement of head restraint guide 40 is directed by track 46, which is mounted to housing 48. Biasing spring 50 acts to direct head restraint guide downward along direction d1. This downward bias acts to move head restraint 16 towards seat back 14. Head restraint activation system 26 also includes gear rack 56, which is mounted to housing 48. Relative motion between gear rack 44 and gear rack 56 is mediated by gear system 58. The downward bias on head restraint guide 40 is counter balance by cable system 60. In a variation, cable system 60 includes a Bowden cable. Cable system 60 includes mantle 62 and cable 64. Cable 64 passes through and is moveable within mantle 62. Mantle 62 contacts attachment member 70. An end of cable 64 is attached to housing 48 at position 66. The gears within gear system 58 are rotatably mounted on attachment member 70. Mantle 62 is somewhat rigid thereby providing a force that resists spring 50. This counteracting force is provided from mantle 62 via attachment member 70 and gear system 58 to gear rack 44. Therefore, when seat back 14 is moved from a raised to a folded position, additional cable 64 is provided out of attachment member 70 at position 76. This additional cable allows spring 50 to push head restraint guide 40 along direction d1 thereby lowering head restraint 16 until the counteracting force provided by the mantle act to stop said motion. Gear system 58 is designed to provide the proper amount of relative motion between gear rack 44 and gear rack 56. FIG. 1 shows that translation of gear system 58 and attachment member 70 by an amount s results in translation of head restraint guide by an amount t. Moreover, guide pin 80, which is in communication with gear system 58 and attachment member 70 movement which guide groove 82 so that the motion is in the proper direction.

Figure 3:
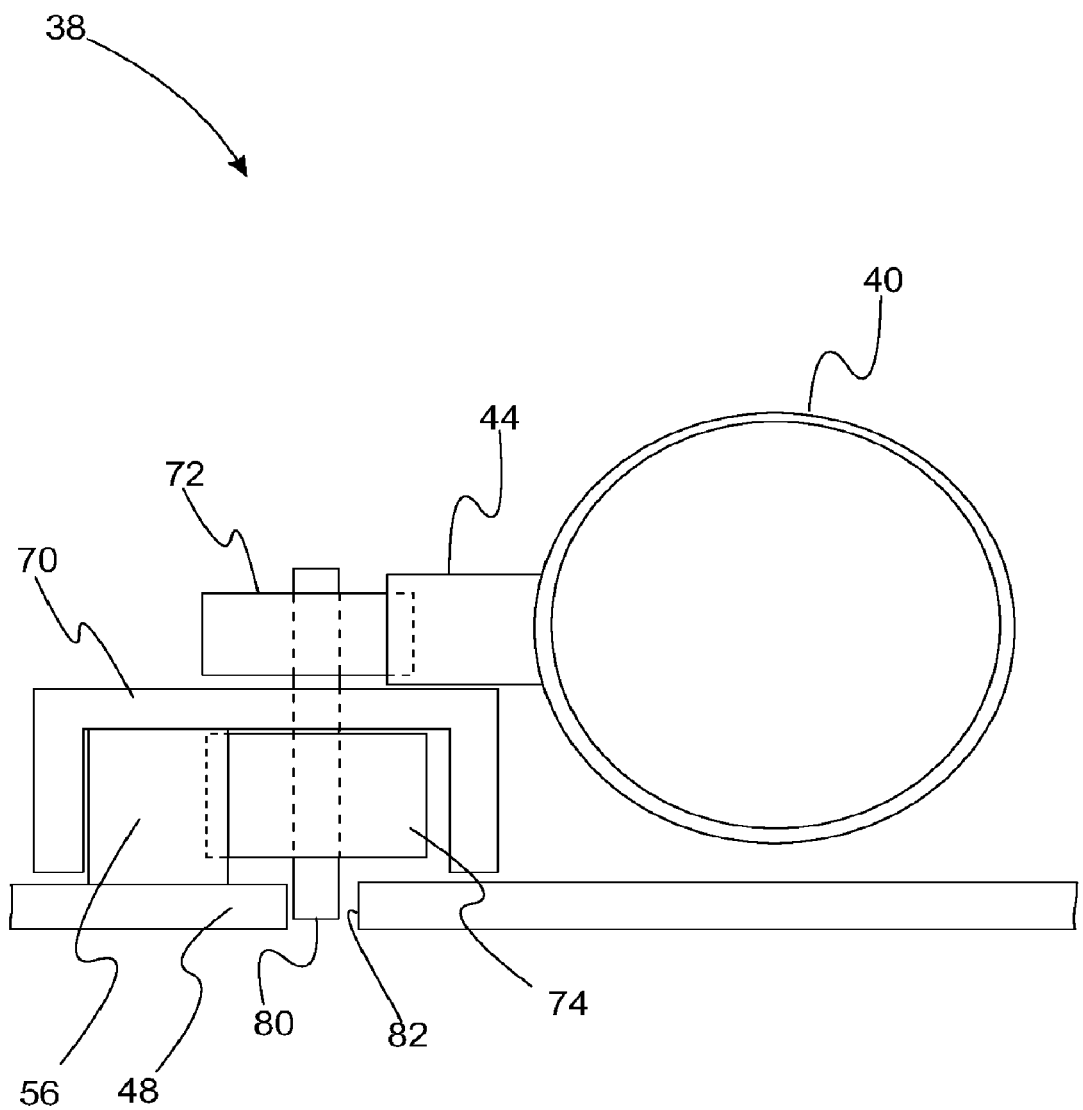
FIG. 3 is an idealized end view of an embodiment of a head restraint activation system.

With reference to FIG. 3, an idealize end view of a variation of the head restraint activation system is provided. The present variation utilizes a gear system having gear wheels of different dimension. Head restraint activation system 26 includes gear rack 44 which is attached to head restraint guide 40 as set forth above. Head restraint activation system 26 also includes gear rack 56, which is mounted to housing 48. Relative motion between gear rack 44 and gear rack 56 is mediated by gear system 58. The gears within gear system 58 are rotatably mounted on attachment member 70. Gear system 58 is designed to provide the proper amount of relative motion between gear rack 44 and gear rack 56. To this end, gear wheels 2, 74 have different dimensions. Specifically, gear wheels 72, 74 will have different diameters. In a variation, the larger diameter wheel is gear wheel 72. Gear wheel 72 is used to drive gear rack 44. In this variation, spring 50 acts on attachment section 70. The amount of translation t of first gear rack 44 and for a given translation s of gear system 58 is given by:

$$t=(1+x/y)s$$

where x is number of teeth in gear wheel 72 and y is the number of teeth in gear wheel 74. This transmission ratio in needed to provide sufficient translation of the head restraint when the vehicle seat is folded.

Figure 4:
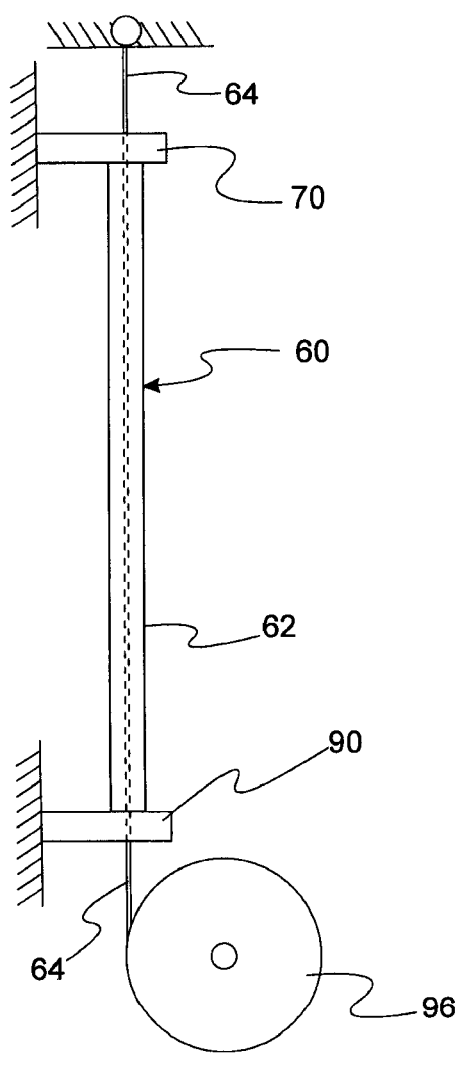
FIG. 4 is a schematic illustrating the operation of a cable system used in a variation of a head restraint activation system.
Figure 4:
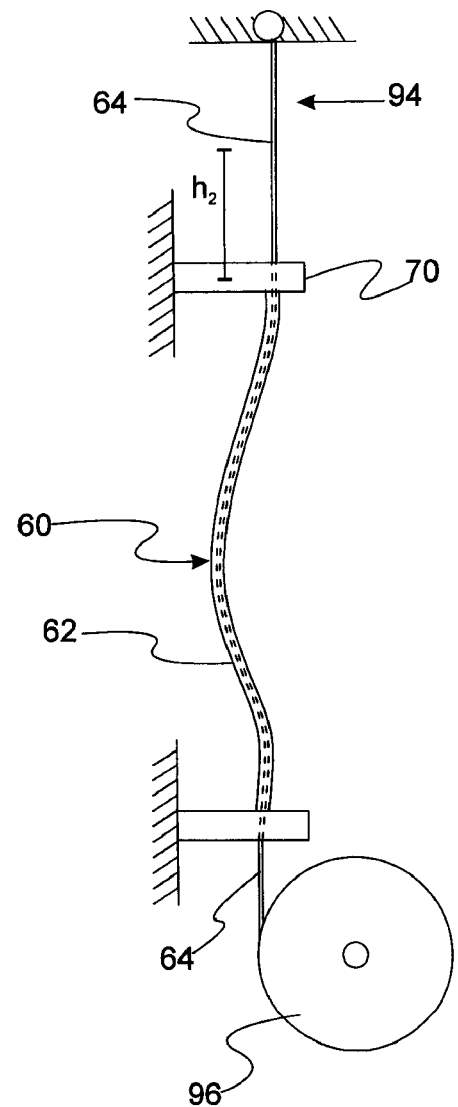

FIG. 4 is a schematic illustrating the operation of cable system 60. In this variation, cable system 60 includes mantle 62 and cable 64 as set forth above. One end of mantle 62 is fixed to fixed attachment member 90. Fixed attachment member 90 is fixed to a position that tends not to move when seat back 14 is folded. In a variation, this member is a pivot member about which seat back 14 rotates. The other end of mantle 62 contacts attachment member 70. When seat back 14 is folded additional cable 64 is fed out toward the top as indicated by item number 94. In one refinement of the present invention, this extra cable is provided from cable spool 96, which rotates along direction d3. As set forth above, this extra cable allows head restraint guide to move downward.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat comprising:
    a seat back;
    a seat bottom;
    a head restraint having at least one head restraint post, the head restraint post adapted to be moveably positioned in the vehicle seat back, the head restraint set at a raised position; and
    a head restraint activation system including:
    a housing;
    a head restraint guide positioned in the seat back and adapted to receive the head restraint post, the head restraint guide allowing the head restraint to be securely held at a selectable position;
    a first gear rack attached to the head restraint guide;
    a second gear rack fixed to the housing;
    a gear system adapted to contact the first and second gear racks and move said gear racks in a relative linear manner;
    an attachment member attached to the gear system; and
    an actuator system that drives the gear system such that positioning of the seat back in a folding position causes the head restraint guide and the head restraint positioned therein to be lowered, wherein the actuator system includes a spring that acts to push the first gear rack down relative to a top of the seat back and a cable system, the cable system having a mantle and a cable passing therein, the cable being attached to the housing and the mantle contacting the attachment member.

2. The vehicle seat of claim 1 wherein the gear system includes a first gear wheel and a second gear wheel, the first gear wheel and the second gear wheel being rotatably mounted on the attachment member, the first gear wheel driving the first gear rack and the second gear wheel driving the second gear rack.

3. The vehicle seat of claim 2 wherein the first gear wheel has a greater diameter than the second gear wheel.

4. The vehicle seat of claim 3 wherein head restraint returns to the raised position when the seat back is returned to a design position.

5. The vehicle seat of claim 2 wherein the mantle provides a counteracting force to the spring, such that when the seat back is moved from a raised to a folded position, additional cable is provided out of the attachment member, the additional cable allowing the spring to push the head restraint downward thereby lowering the head restraint.

6. A vehicle seat comprising:
- a seat back;
- a seat bottom;
- a head restraint having at least one head restraint post, the post adapted to be moveably positioned in the vehicle seat back, the head restraint set at a raised position; and
- a head restraint activation system including:
  - a housing;
  - a head restraint guide positioned in the seat back and adapted to receive the head restraint post, the head restraint guide holding the head restraint at a selectable position;
  - a first gear rack attached to the head restraint guide;
  - a second gear rack fixed to the housing;
  - a gear system contacting the first and second gear racks;
  - a spring that acts to push the first gear rack down relative to a top of the seat back;
  - an attachment member attached to the gear; system; and
  - a cable system having a mantle and a cable passing therein, an end of the cable being fixed relative to the housing,
  - wherein the mantle provides a counteracting force to the spring, such that when the seat back is moved from a raised to a folded position, additional cable is provided out of the attachment member, the additional cable allowing the spring to push the head restraint downward thereby lowering the head restraint.

7. The vehicle seat of claim 6 wherein the gear system includes a first gear wheel and a second gear wheel, the first gear wheel and the second gear wheel being rotatably mounted on the attachment member, the first gear wheel driving the first gear rack and the second gear wheel driving the second gear rack.

8. The vehicle seat of claim 7 wherein the first gear wheel has a greater diameter than the second gear wheel.

* * * * *